US010061672B2

(12) United States Patent
Dagan et al.

(10) Patent No.: US 10,061,672 B2
(45) Date of Patent: Aug. 28, 2018

(54) IMPLEMENTING RANDOM CONTENT OF PROGRAM LOOPS IN RANDOM TEST GENERATION FOR PROCESSOR VERIFICATION

(71) Applicant: International Business Machines Corporation, Armonk, NY (US)

(72) Inventors: Adi Dagan, Kiryat Motzkin (IL); Avishai Fedida, Haifa (IL); Olaf K. Hendrickson, Rochester, MN (US); Oz Hershkovitz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 13/789,232

(22) Filed: Mar. 7, 2013

(65) Prior Publication Data
US 2014/0257739 A1 Sep. 11, 2014

(51) Int. Cl.
*G06F 11/263* (2006.01)
*G06F 11/22* (2006.01)

(52) U.S. Cl.
CPC ........ *G06F 11/263* (2013.01); *G06F 11/2236* (2013.01)

(58) Field of Classification Search
CPC ............................ G06F 11/2236; G06F 11/263
See application file for complete search history.

(56) References Cited

U.S. PATENT DOCUMENTS

| 4,516,156 A * | 5/1985 | Fabris | G06F 3/033 |
| | | | 348/14.1 |
| 4,872,168 A * | 10/1989 | Aadsen | G11C 29/10 |
| | | | 714/720 |
| 5,956,478 A * | 9/1999 | Huggins | G01B 31/318307 |
| | | | 712/234 |
| 6,006,028 A * | 12/1999 | Aharon | G06F 11/3684 |
| | | | 703/21 |
| 6,327,559 B1 | 12/2001 | Wile | |

(Continued)

OTHER PUBLICATIONS

A. Aharon et al., "Verification of the IBM RISC System/6000 by a dynamic biased pseudo random test program generator," IBM Systems Journal vol. 30, No. 4, pp. 527-538, 1991.

(Continued)

*Primary Examiner* — Alexander Satanovsky
(74) *Attorney, Agent, or Firm* — Joan Pennington

(57) ABSTRACT

A method and apparatus are provided for implementing random content of program loops in random test generation for processor verification. A converged branch instruction stream is used by a test generator to ensure that all random conditional branches converge to a main program loop. A built in exception handling mechanism of the test generator enables program interrupts to converge to the main program loop. Mandatory read only registers applied to the test generator allow all register based storage addresses to use registers that maintain a value and thus stabilize the storage address translations through subsequent iterations of the loop. A global class restriction mechanism defines specific restricted instruction classes applied to the test generator avoids inherently problematic operations for the program loops. Machine state detection and restoration mechanisms in the test generator are provided to preserve storage addressability.

12 Claims, 11 Drawing Sheets

(56) References Cited

U.S. PATENT DOCUMENTS

| | | | |
|---|---|---|---|
| 7,133,816 B2 | 11/2006 | Adir et al. | |
| 7,140,003 B2 | 11/2006 | Decker | |
| 7,370,296 B2 | 5/2008 | Koyfman et al. | |
| 2007/0010975 A1* | 1/2007 | Fine | G06F 17/504 703/2 |
| 2010/0218149 A1 | 8/2010 | Sasaki | |
| 2011/0099431 A1 | 4/2011 | Almog et al. | |
| 2012/0131386 A1 | 5/2012 | Fournier et al. | |
| 2012/0324208 A1 | 12/2012 | Alapati et al. | |
| 2013/0152048 A1* | 6/2013 | Sato | G06F 11/2236 717/124 |

OTHER PUBLICATIONS

E. Bin et al., "Using a constraint satisfaction formulation and solution techniques for random test program generation," IBM systems journal vol. 41 No. 3 pp. 386-402, 2002.

C. Krygowski et al., "Key advances in the presilicon functional verification of the IBM zEnterprise microprocessor and storage hierarchy," IBM Journal Research and Development, vol. 56, No. 1/2, pp. 13:1-13-16, 1991.

A, Kamkin et al., "Reconfigurable Model-Based Test Program Generator for Microprocessors," 2011 Fourth International Conference on Software Testing, pp. 47-54, 2011.

A. Adir et al., "Genesys-Pro: Innovations in Test Program Generation for Functional Processor Verification," IEEE Design and Test of Computers, vol. 21, No. 2, pp. 84-93, Mar./Apr. 2004.

C. Krygowski et al., "Functional verification of the IBM System z10 processor chipset," IBM Journal Research and Development, vol. 53, No. 1, pp. 3:1-3:11, 2009.

U.S. Appl. No. 13/789,177, filed on the same date herewith, to Craig T. Atherton et al., assigned to the present assignee, and entitled "Implementing Automated Memory Address Recording in Constrained Random Test Generation for Verification of Processor Hardware Designs".

* cited by examiner

EXAMPLE LOOP 1, FIRST PASS
200

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 2000 | LOAD IMMEDIATE 5,1000 | R5<=1000 | INITIALIZE REGISTER 5 | 100 |
| 2004 | LOAD IMMEDIATE 15,3 | R15<=0003 | INITIALIZE REGISTER 15. THIS IS THE LOOP COUNTER RESERVED REGISTER | 101 |
| 2008 | LOAD IMMEDIATE 3,FFE0 | R3<=FFE0 | INITIALIZE REGISTER 3 | 102 |
| 200C= STARTLOOP1 | ADD IMMEDIATE 3,0010 | R3<=FFF0 CONDITION <= NOT ZERO | RANDOM LOOP BODY | 103 |
| 2010 | CONDITIONAL BRANCH TO BRANCHTARGET1 IF RESULT<> 0 | | RANDOM LOOP BODY BRANCH IS TAKEN TO A 'FAR AWAY' ADDRESS | 104 |
| 2014 | ADD 5,5,2 | | THIS IS A BNT INSTRUCTION | 105 |
| 2018 | | | THIS LOCATION IS UNUSED | 106 |
| | | | THERE ARE MANY UNUSED MEMORY LOCATIONS UNTIL THE TEST RESUMES AT A BRANCH TARGET LOCATION | 107 |
| 2100= BRANCH TARGET1 | BRANCH ON COUNT TO STARTLOOP1 USING R15 AS COUNT | | DIRECTED INSTRUCTION TO 'CLOSE' THE LOOP | 108 |

FIG. 2

EXAMPLE LOOP 1, SECOND PASS
(REENTRANT MODE) EARLY EXIT
300

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 200C= STARTLOOP1 | ADD IMMEDIATE 3,0010 | R3<=0000 CONDITION <= ZERO | REENTRANT INSTRUCTION | 203 |
| 2010 | CONDITIONAL BRANCH TO BRANCHTARGET1 IF RESULT<>0 | | REENTRANT INSTRUCTION. BRANCH IS NOT TAKEN | 204 |
| 2014 | ADD 5,5,2 | | THIS INSTRUCTION WAS GENERATED AS A RANDOM 'BRANCH-NOT-TAKEN' BUT IS NOW EXECUTED AS PART OF A 'BRANCH-TAKEN' PATH | 205 |
| 2018 | END-OF-TEST | | THIS LOCATION IS UNUSED. THE TEST GENERATOR OBSERVES THAT IT HAS EXITED 'REENTRANT' MODE AND RETURNS TO THE TEST DEFINITION FOR DIRECTIONS. THE DIRECTIONS SPECIFY 'END OF TEST' | 206 |
| | | | THERE ARE MANY UNUSED MEMORY LOCATIONS UNTIL THE TEST RESUMES AT A BRANCH TARGET LOCATION | 207 |
| 2100= BRANCH TARGET1 | BRANCH ON COUNT TO STARTLOOP1 USING R15 AS COUNT | R15=3 R15<=2 | DIRECTED INSTRUCTION TO 'CLOSE' THE LOOP | 208 |

FIG. 3

LOOP CONDITIONAL BRANCH
EXAMPLE LOOP 1, FIRST PASS
400

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 2000 | LOAD IMMEDIATE 5,1000 | R5<=1000 | INITIALIZE REGISTER 5 | 300 |
| 2004 | LOAD IMMEDIATE 15,3 | R15<=0003 | INITIALIZE REGISTER 15. THIS IS THE LOOP COUNTER RESERVED REGISTER | 301 |
| 2008 | LOAD IMMEDIATE 3,FFE0 | R3<=FFE0 | INITIALIZE REGISTER 3 | 302 |
| 200C= STARTLOOP1 | ADD IMMEDIATE 3,0010 | R3<=FFF0 CONDITION <= NOT ZERO | RANDOM LOOP BODY | 303 |
| 2010 | CONDITIONAL BRANCH TO BRANCHTARGET1 IF RESULT<> 0 | | RANDOM LOOP BODY BRANCH IS TAKEN TO A 'FAR AWAY' ADDRESS | 304 |
| 2014 | ADD 5,5,2 | | THIS IS GENERATED AS A BNT | 305 |
| 2018 | BRANCH TO BRANCHTARGET1 | | THIS GENERATED AS A BNT. THIS IS THE "CONVERGING BRANCH" | 306 |
| | | | THERE ARE MANY UNUSED MEMORY LOCATIONS UNTIL THE TEST RESUMES AT A BRANCH TARGET LOCATION | 307 |
| 2100= BRANCH TARGET1 | BRANCH ON COUNT TO STARTLOOP1 USING R15 AS COUNT | R15=3 R15<=2 | DIRECTED INSTRUCTION TO 'CLOSE' THE LOOP | 308 |

FIG. 4

EXAMPLE LOOP 1, SECOND PASS (REENTRANT MODE)
500

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 200C= STARTLOOP1 | ADD IMMEDIATE 3,0010 | R3<=0000 CONDITION <= ZERO | REENTRANT INSTRUCTION | 403 |
| 2010 | CONDITIONAL BRANCH TO BRANCHTARGET1 IF RESULT<>0 | | REENTRANT INSTRUCTION. BRANCH IS NOT TAKEN | 404 |
| 2014 | ADD 5,5,2 | | THIS INSTRUCTION WAS GENERATED AS A RANDOM 'BRANCH-NOT-TAKEN' BUT IS NOW EXECUTED AS PART OF A 'BRANCH-TAKEN' PATH | 405 |
| 2018 | BRANCH TO BRANCHTARGET1 | | ORIGINALLY GENERATED AS A BNT INSTRUCTION, THIS INSTRUCTION NOW BRANCHES TO 2100, RETURNING THE INSTRUCTION EXECUTION TO THE ORIGINAL GENERATED PATH. | 406 |
| | | | THERE ARE MANY UNUSED MEMORY LOCATIONS UNTIL THE TEST RESUMES AT A BRANCH TARGET LOCATION | 407 |
| 2100= BRANCH TARGET1 | BRANCH ON COUNT TO STARTLOOP1 USING R15 AS COUNT | R15=3 R15<=2 | DIRECTED INSTRUCTION TO 'CLOSE' THE LOOP | 408 |

FIG. 5

EXAMPLE LOOP 2, FIRST PASS
600

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 2000 | LOAD IMMEDIATE 5,1000 | R5<=1000 | INITIALIZE REGISTER 5 | 500 |
| 2004 | LOAD IMMEDIATE 15,3 | R15<=0003 | INITIALIZE REGISTER 15. THIS IS THE LOOP COUNTER RESERVED REGISTER | 501 |
| 2008 = STARTLOOP2 | LOAD 2,100(5) | R5=1000 R2<=1234 | RANDOM LOOP BODY LOAD FROM MEM @1100 | 502 |
| 200C | ADD 5,2,5 | R5<=2234 | RANDOM LOOP BODY | 503 |
| 2010 | BRANCH ON COUNT TO STARTLOOP2 USING R15 AS COUNT | R15 = 3 R15 <= 2 | DIRECTED INSTRUCTION TO 'CLOSE' THE LOOP | 504 |

FIG. 6

EXAMPLE LOOP 2, SECOND PASS
(REENTRANT MODE) EARLY EXIT DUE TO
EXCEPTIONS
700

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 2008 = STARTLOOP2 | LOAD 2,100(5) | R5=2234 | ATTEMPTED USE OF ADDRESS 2334 DOES NOT HAVE A TRANSLATION. AN INTERRUPT OCCURS HERE. | 602 |
| 20000 | LPSW | | EXCEPTION HANDLER. "RETURN FROM INTERRUPT" TO A RANDOM LOCATION 3000 | 603 |
| 3000 | END-OF-TEST | | THIS LOCATION IS UNUSED. THE TEST GENERATOR OBSERVES THAT IT HAS EXITED 'REENTRANT' MODE AND RETURNS TO THE TEST DEFINITION FOR DIRECTIONS. THE DIRECTIONS SPECIFY 'END OF TEST'. | 604 |

FIG. 7

EXAMPLE LOOP 2, SECOND PASS
(REENTRANT MODE) NO EXIT
800

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 2008 = STARTLOOP2 | LOAD 2,100(5) | R5=2234 | ATTEMPTED USE OF ADDRESS 2334 DOES NOT HAVE A TRANSLATION. AN INTERRUPT OCCURS HERE | 702 |
| 20000 | LPSW | | EXCEPTION HANDLER. "RETURN FROM INTERRUPT" TO NEXT SEQUENTIAL ADDRESS AFTER THE INTERRUPTED EXCEPTION. | 703 |
| 200C | ADD 5,2,5 | R2=1234 R5=2234 R5<=3468 | RANDOM LOOP BODY | 703 |
| 2010 | BRANCH ON COUNT TO STARTLOOP2 USING R15 AS COUNT | R15=3 R15<=2 | DIRECTED INSTRUCTION TO 'CLOSE' THE LOOP | 704 |

FIG. 8

EXAMPLE LOOP 2B, FIRST PASS
(EFFECT OF READ ONLY REGISTERS ON RANDOM LOOP)
900

| INSTR ADDRESS LABEL (VALUE) 202 | INSTR PSEUDO MNEMONIC 204 | REGISTER VALUE 206 | COMMENTS 208 | REFERENCE 210 |
|---|---|---|---|---|
| 1FFC | LOAD IMMEDIATE 6,1000 | R6<=1000 | INITIALIZE REGISTER 6. TELL TEST GENERATOR REGISTER 6 IS 'READ ONLY' | 899 |
| 2000 | LOAD IMMEDIATE 5,1000 | R5<=1000 | INITIALIZE REGISTER 5 | 800 |
| 2004 | LOAD IMMEDIATE 15,3 | R15<=0003 | INITIALIZE REGISTER 15 THIS IS THE LOOP COUNTER, RESERVED REGISTER | 801 |
| 2008 = STARTLOOP2 | LOAD 2,100(6) | R6=1000 R2<=1234 | LOAD FROM MEM @ 1100 REQUIRING USE OF READ ONLY REGISTER (REG 6 IS READ ONLY) | 802 |
| 200C | ADD 5,2,5 | R2=1234 R5=1000 R5<=2234 | RANDOM LOOP BODY | 803 |
| 2010 | BRANCH ON COUNT TO STARTLOOP2 USING R15 AS COUNT | R15=3 R15<=2 | DIRECTED INSTRUCTION TO 'CLOSE' THE LOOP | 804 |

FIG. 9

IMPLEMENTING RANDOM CONTENT OF PROGRAM LOOPS IN RANDOM TEST GENERATION FOR PROCESSOR VERIFICATION

FIELD OF THE INVENTION

The present invention relates generally to the data processing field, and more particularly, relates to a method and apparatus for implementing random content of program loops in random test generation for processor verification.

DESCRIPTION OF THE RELATED ART

Processor pre-silicon functional verification is typically accomplished using test definitions with an automated test case generation tool, such as IBM Genesys Pro Test Program Generator which produces a sequence of assembly level instructions. These test definitions are typically produced by engineers to exercise specific architectural and micro-architectural features of the processor.

Constrained random test program generators face significant obstacles trying to generate random program loops and program loops that are important to use during pre-silicon verification of new processor designs.

U.S. Pat. No. 6,006,028 to Aharon et al., issued Dec. 21, 1999, and assigned to the present assignee discloses an architecture-independent test program generator for producing test programs for checking the operation of a hardware processor design comprises means for storing data representing the processor instruction set and resources, and logic for generating, for subsequent storage or processing, test programs from said stored data, characterized in that the data is a separate declarative specification, the generator comprising logic for extracting said data from the storage means, and in that the relationships between the processor resources and semantic entities associated with each instruction are modeled in said declarative specification.

Instruction fetch and branch prediction logic are complex and require test program loops to properly verify. For example, U.S. Pat. No. 6,327,559, entitled "Method For Creating A Simulation Environment For Enhanced Logic Verification Of A Branch History Table" issued to Wile Dec. 4, 2001, and assigned to the present assignee discloses a method for creating a verification environment to drive a Branch History Table. It consists of two components. First, a method for creating instruction streams for controlling the stress on branch history table logic. The second is a method for pre-loading the branch history array to allow for interesting simulations at the beginning of the test.

See also "Functional verification of the IBM System z10 processor chipset", IBM Journal of Research and Development, v 53, n 1, p 1-11, 2009 which in reference to instruction fetch and branch prediction verification, states that an inherent limitation in a purely random command driven simulation environment is the inability to execute a meaningful architectural instruction sequence.

See also "Reconfigurable Model-Based Test Program Generator for Microprocessors", 2011 Fourth International Conference on Software Testing, Verification and Validation Workshops which states: "Being mostly a random generator, RAVEN lacks for facilities for systematic verification of complex situations" in reverence to Obsidian Software's RAVEN Test Program Generator and further states: "ADL-based instruction set specifications provide enough information for generating branching programs not getting caught in an endless loop."

IBM's GenesysPro Random Test Program Generator also avoids getting caught up in endless loops while generating random instruction streams, largely by preventing looping except for special tests hand designed by the verification engineers, see "Genesys-Pro: Innovations in Test Program Generation for Functional Processor Verification", IEEE Design and Test of Computers, v 21, n 2, p 84-93, March/April 2004.

Some of the main problems involved in generating loops include (A) conditional branches and (B) exceptions. Each of those specific problems results in an early exit from a loop and so nullify the potential benefits of the loop. Other problems involve (C) storage addresses and yet other problems arise from the use of (D) certain specific complex ops who's nature contribute to serious difficulties when used in a program loop. Also of concern are (E) implicit branches or storage translation problems as a result of processor state changes.

The specific nature of conditional branches is that during original test generation, a branch will route instruction execution in one of two directions, either to the next sequential instruction following the branch instruction, or to a new branch target address. During the original branch instruction generation, the branch direction (taken or not taken) is evaluated and the test generator correctly follows the taken path. During subsequent iterations of the loop, the direction of the same branch instruction can change causing program execution to proceed down a new path that is different from the original path and so avoids the hardware state situations that we were intending to exercise with the original instruction sequence. This is referred to as an early exit from the loop. It is possible to detect early exits from loops and try to compensate using a branch back to the top of the loop, just as is done at the end of the generation of the original sequence of instructions to "close the loop" by branching to an previously generated instruction which becomes the "top of the loop". However if the early exit from the loop is close to the top of the loop, we end up bypassing most of the original body of the loop, and avoid the intended sequence of instructions that we wish to test. It is also possible to try to establish a new sequence following every possible path of every branch, but this causes test size explosion and also negates some of the benefits of having a single loop executed multiple times. A better method is required to stay in the loop.

An existing mechanism used in the IBM Genesys Pro constrained random test generator is called a Branch-Not-Taken ("BNT"). US patent publication No. US 2012/0131386A1 to Fournier et al., published May 24, 2012, assigned to the present assignee and entitled "Verification of Speculative Execution" discloses a separate innovation targeted to improved generation of speculative execution paths in the situation of the BNT.

The current conventional use of the BNT methodology, including that described by the above-identified US 2012/0131386A1 does not address the concomitant early exit from the loop. US patent publication No. US 2012/0324208A1 to Alapati et al., published Dec. 20, 2012, assigned to the present assignee and entitled "Effective Validation of Execution Units Within a Processor" describes a post silicon lab exerciser. Post silicon lab exercisers are much better than pre silicon constrained random test generators at stressing speculative execution, as the post silicon lab exercisers normally operate with looping and very high loop counts, with regular changes in the contents of the loop. It would be very useful to be able to verify computer system designs with intensive loops pre-silicon.

A specific problem of using storage instructions in random loops is that storage addresses are often specified as based on current register values which can change with each iteration of the loop as register values change. It is a fundamental characteristic of random test program generation that such changes to register values cause change in random ways. Maintaining storage addressability in constrained random test generators is a subject of innovation of in its own right. For example, see U.S. Pat. No. 7,133,816 B2 to Adir et al., issued Nov. 7, 2006, assigned to the present assignee and entitled "Test Quality Through Resource Reallocation" and U.S. Pat. No. 7,370,296 B2 to Koyfman et al., issued May 6, 2008, assigned to the present assignee and entitled "Modeling Language and Method for Address Translation Design Mechanisms in Test Generation". Generating a random loop benefits from these innovations and others while generating the original instructions of a loop, but they are unable to be involved during subsequent iterations of a loop, resulting in undesirable behavior, and in some cases can cause the test generation to fail.

One existing means to constrain storage addresses used in random loops in IBM Genesys Pro is called a "Read Only Register" bias. However as a bias it is not mandatory and the random nature of the generator can some times lead to cases of a non read only register being used to calculate a storage address. When this happens on a load or store op, an exception condition often arises on subsequent iterations of the loop, leading to possible early exit from the loop and when this happens on a branch operation, this could also lead to early exit of the loop. A "generation directive" is described, for example, in the above-identified U.S. Pat. No. 6,006,028.

Exception conditions that cause any type of program interrupt also can result in early exit from a loop. Random test generation for a processor requires establishing exceptions handlers as well as the specific test scenario of interest. Constrained Random Test Generators using a relocatable interrupt handler will often "recover" from an exception condition by changing the instruction address location, in essence a type of branch that causes early exit from the loop. In the case of the constrained random test generator used to verify new computer systems that implement the IBM z/Architecture, the program interrupt handler is specifically designed to often return to a new and random instruction address.

US patent publication No. US 20110099431 A1 to Almog et al., published Apr. 28, 2011, and assigned to the present assignee, discloses a relocatable interrupt handler for use in test generation and execution. A computer program product for executing test code includes a tangible storage medium storing instructions for execution by a processing circuit for performing a method. The method includes executing a test code block that includes a plurality of test instructions. The executing includes, for one or more of the test instructions: executing the test instruction at a first memory location; determining that the executing test instruction caused an exception condition to occur; executing exception handling logic associated with the exception condition in response to determining that the executing test instruction caused the exception condition to occur, the exception handling logic executed at a second memory location that is different than the first memory location; and clearing the exception condition. A return code that indicates a result of executing the test code block is then generated.

Some instructions present complications for Test Program Generators when they are executed multiple times in a loop body. In IBM's z/Architecture, several instructions such as SIE (Start Interpretive Execution) or PLO (Preform Locked Operation) are difficult just because they are complex architecturally. Other instructions, such as arithmetic operations which take two operand inputs and over write one of the input operands with the result (a "destructive" architecture) can pose some difficulties with recursive iterations causing the result to overflow or underflow. Eventual overflow or underflow that leads to an exception that cannot be blocked poses a problem for a test intending to keep pipes full and much of the time are to be avoided.

A complex computer architecture such as IBM z/Architecture has many operating modes and states which affect address translation. The random execution of any instruction that alters an operating mode or machine state can make a storage address that has already been used, untranslatable, resulting in a translation fault exception leading to early exit, or can make an address translate to a different real address, resulting in a branch that is an early exit from the loop.

One method of staying in the loop is to avoid use of random conditional branches in the body of loops, but if the intended target of the test is those very conditional branch instructions, this does not help. It is also possible to implement a specific conditional branch instruction in a loop and provide specific biasing to remain in the loop, but this is a manual process and negates the advantages of full random test generation. Adding constraints to the test generation to avoid exception conditions is also widely used when generating loops now. Since exception conditions are very important to verify when designing a new computer processor, a better way to generate random operations in a loop is needed.

A need exists for an efficient and effective method and apparatus for implementing random content of program loops in random test generation for processor verification.

SUMMARY OF THE INVENTION

Principal aspects of the present invention are to provide a method and apparatus for implementing random content of program loops in random test generation for processor verification. Other important aspects of the present invention are to provide such method and apparatus substantially without negative effects and that overcome many of the disadvantages of prior art arrangements.

In brief, a method and apparatus are provided for implementing random content of program loops in random test generation for processor verification. A converged branch instruction stream is used by a test generator to ensure that all random conditional branches converge to a main program loop. A built in exception handling mechanism of the test generator enables program interrupts to converge to the main program loop. Mandatory read only registers applied to the test generator allow all register based storage addresses to use registers that maintain a value and thus stabilize the storage address translations through subsequent iterations of the loop. A global class restriction mechanism defines specific restricted instruction classes applied to the test generator avoids inherently problematic operations for the program loops. Machine state detection and restoration mechanisms in the test generator are provided to preserve storage addressability.

In accordance with features of the invention, the converged branch instruction stream being used by said constrained random test generator to ensure that all random conditional branches converge to a main program loop includes a predefined test definition including a memory logical address of the random conditional branch, and a target logical address of the random conditional branch. The predefined test definition generates random instructions for a processor execution path ending with an unconditional branch to the same memory logical address of the random conditional branch.

In accordance with features of the invention, the built in exception handling mechanism uses hardware state information to calculate a return address after the program interrupt.

In accordance with features of the invention, the mandatory read only registers provide global generation hard constraints.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3, 4, and 5 together provide an example loop for implementing random content of program loops in random test generation for processor verification in accordance with the preferred embodiment;

FIGS. 6, 7 and 8 together provide another example loop for implementing random content of program loops in random test generation for processor verification in accordance with the preferred embodiment;

FIG. 9 provides another example loop for implementing random content of program loops in random test generation for processor verification in accordance with the preferred embodiment.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing random content of program loops in random test generation for processor verification. While the current invention does not circumvent the need for verification engineers to initiate and close a test loop, the contents of the loop advantageously can be fully randomized, with some limited constraints. The current invention provides improvement over known pre silicon test generation that turns static speculative execution where a section of code is available for speculative execution only once into a case where the speculatively executed code could have already been actually executed and the conditional branch decision is reversed and now the once executed code become speculatively executed and vice versa, the once speculative code becomes executed.

Figure 1A:
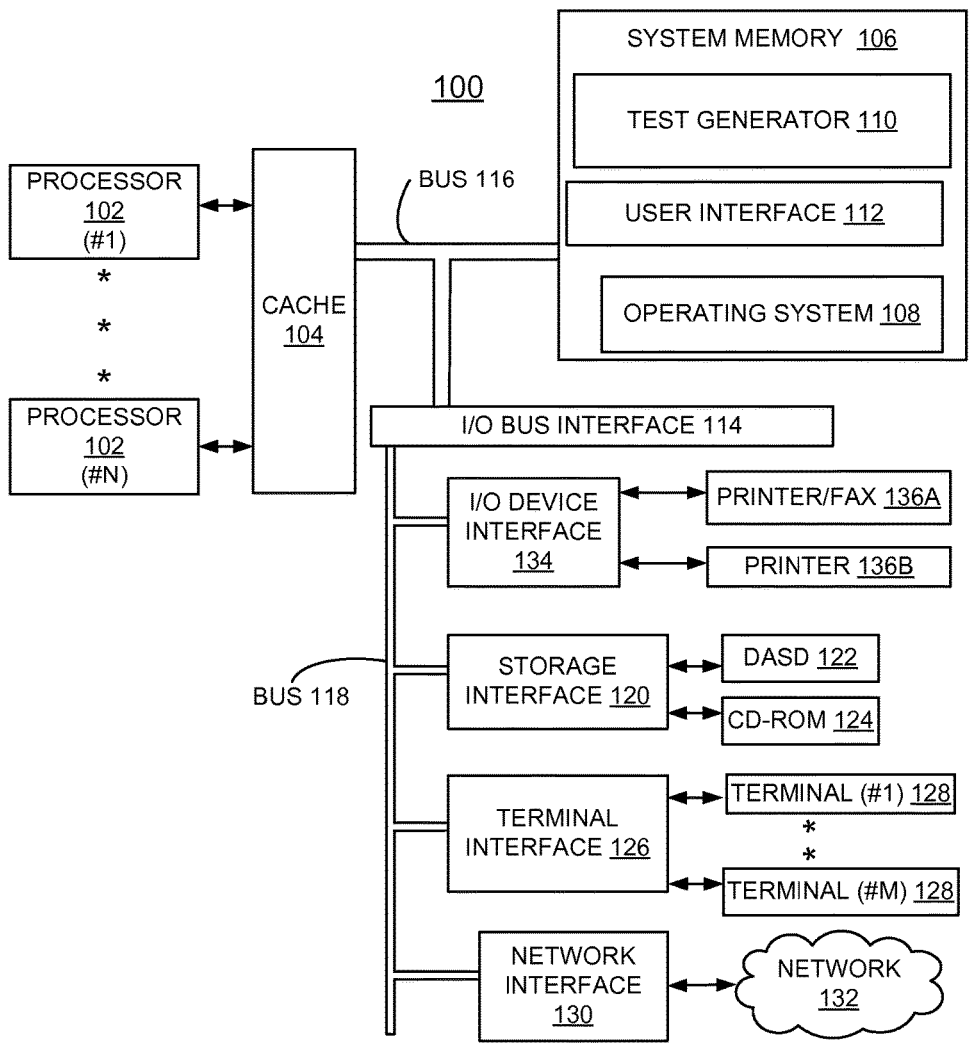
FIG. 1A is a block diagram of an example computer system for implementing random content of program loops in random test generation for processor verification in accordance with the preferred embodiment.
Figure 1B:
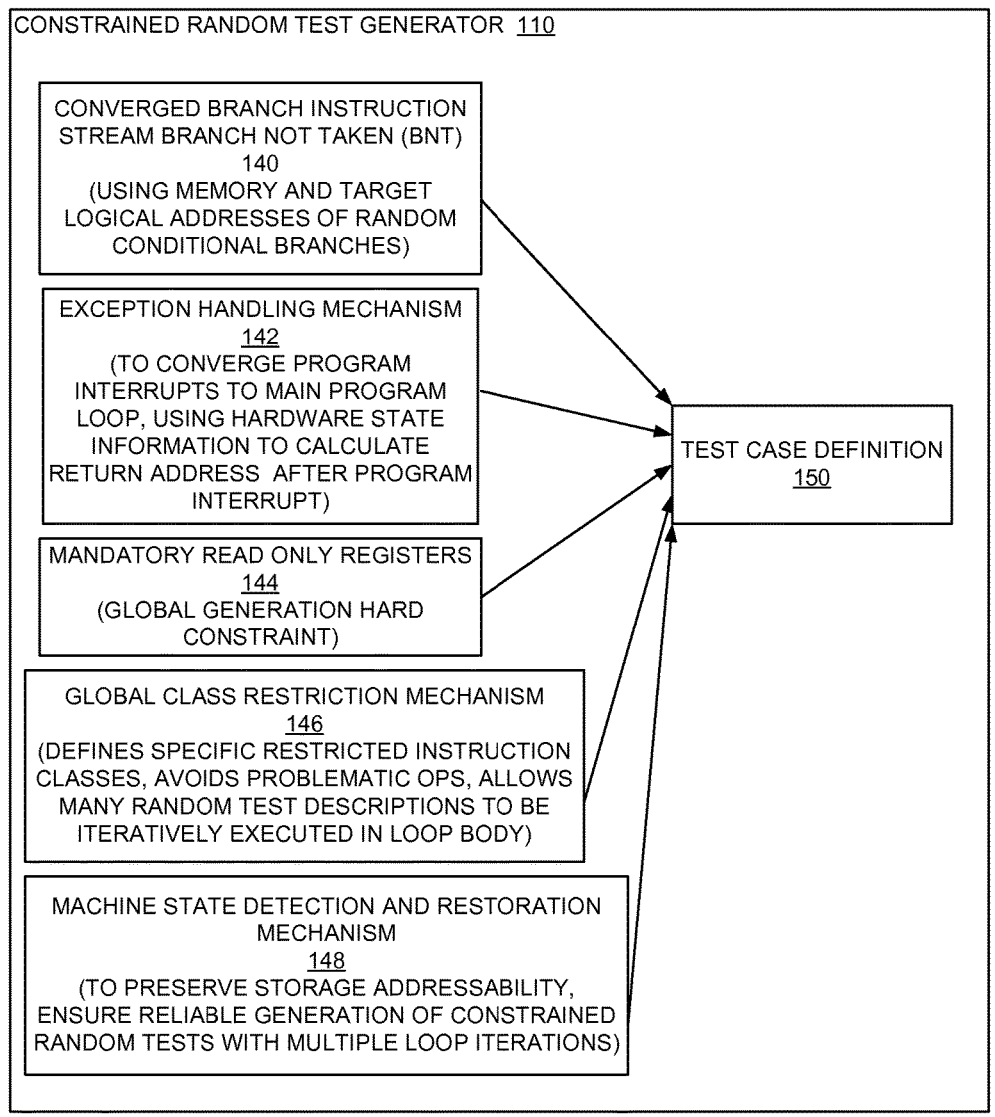
FIG. 1B is a block diagram of a test generator of the system of FIG. 1 for implementing random content of program loops in random test generation for processor verification in accordance with the preferred embodiment.

Having reference now to the drawings, in FIGS. 1A and 1B, there is shown a computer system embodying the present invention generally designated by the reference character 100 for implementing random content of program loops in random test generation for processor verification in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106, an operating system 108, a test generator 110 in accordance with an embodiment of the invention and a user interface 112. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Referring to FIG. 1B, there are shown example enhanced functions of constrained random test generator 110 in accordance with the preferred embodiment. Test generator 110 includes a converged branch instruction stream Branch Not Taken (BNT) function 140, an exception handling mechanism 142 to converge program interrupts, a plurality of mandatory read only registers 144, a global class restriction mechanism 146 defining specific restricted instructions classes, and a machine state detection and restoration mechanism 148 to preserve storage addressability, each applies a functional result to a test case definition 150 in accordance with the preferred embodiment. The combination of all these techniques and mechanisms 140, 142, 144, 146, 148 in the constrained random test generator 110 are required to ensure reliable generation of constrained random tests involving many iterations of a loop. The advantage of using these techniques and mechanisms is that we can generate looping tests with a greater random nature and target more complex hardware scenarios. Also, without using these techniques and mechanisms attempts to generate program loop tests with largely random contents causes the test generator to fail due to too many constraints, we end up with no test at all and if it did manage to generate a test, the tests suffer from so many early exit situations that the tests do not actually exercise the intended scenario.

The converged branch instruction stream Branch Not Taken (BNT) function 140 is a new invention that is built into the BNT mechanism of test generator 110. When a test generates any branch like instruction, there are at least two paths, commonly referred to as the taken path and not-taken path. The conventional method of generating instructions to stimulate the processor's speculative execution ability involves a predefined test definition which is invoked after each branch like instruction, a branch-not-taken (BNT) apparatus. With prior art, the BNT apparatus was not aware of details of the original branch. A new feature of the test generator 110 allows the predefined test definition which is invoked as the BNT to be aware of the details of the original branch including specifically, the memory logical address of the branch, and the target logical address of the branch. Then, from factoring in the current hardware state, we can determine if the branch was taken or not. The BNT test definition which generates random instructions for the processor's speculative execution path then advantageously is modified on the fly to end the random generation of speculative instruction stream with an unconditional branch to the same memory location as the original branch taken address. In this way, regardless of whether or not a branch is taken, the instruction stream always converges to the same memory address. When the converged branch instruction stream BNT 140 is used when generating random instructions in a loop, we can freely generate conditional branch and other branch like instructions. As the body of the loop executes multiple times, the actual direction of each conditional branch instance can change randomly but will always converge to the same memory location, staying in the loop for the full number of designated loop iterations.

The exception handling mechanism 142 to converge program interrupts is a deterministic return from interrupt handler 142. The relocatable interrupt handler for test generation and execution subject matter of the above-identified US patent publication No. US20110099431A1 is incorporated herein by reference. The deterministic return from interrupt handler 142 is relocatable and after querying the hardware state does one of the following: When the interrupt involves an instruction address translation exception, the deterministic return from interrupt handler 142 must use current hardware state information, particularly, the interrupted instruction logical address, and some translation specific hardware state information, to calculate a new address to return to, in a deterministic fashion. When the interrupt does not involve an instruction address translation exception, the deterministic return from interrupt handler 142 queries the architected state information about the interrupt and returns to the next sequential address after the original interrupted instruction.

The mandatory read only register 144 is an enhanced global generation bias including a hard constraint. The mandatory read only register 144 causes randomly generated instructions that use storage operands to use base and index registers that never change value and since the mandatory read only register 144 never change value, the instructions that reference storage will never get translation exceptions regardless of how many times the body of a loop iterates.

The global class restriction mechanism 146 defines specific restricted instructions classes used as a global class restriction mechanism to tell the test generator 110 to avoid problematic ops allowing many random test descriptions that are not specifically written to be iteratively executed in a loop body to be used in a loop. See U.S. Pat. No. 7,140,003 to Decker issued Nov. 21, 2006 and assigned to the present assignee, entitled "Method and System for Specifying Sets of Instructions for Selection by an Instruction Generator."

The machine state detection and restoration mechanism 148 is used to preserve storage addressability. When a verification engineer constructs the loop, there is a clear start and end point, or there may be several but still clearly distinct start and/or end points. The machine state detection and restoration mechanism 148 greatly aids successful generation of a loop that remembers the state of the machine at the top of the loop to restore the state of the machine, if there is a difference at each end point of a loop. An example of a state change from IBM's z/Architecture is use of Addressing Mode as described in IBM "z/Architecture Principles of Operation" includes the simple instructions SAM24, SAM31 and SAM64. For example, when a loop starts in 64 bit addressing mode and actually uses addresses greater than 0x000000007FFFFFFF, along the way a randomly generated branch to an instruction address less than 0x000000007FFFFFFF, and then a randomly generated SAM31 instruction can leave the processor in a state where a simple branch to the start of the loop is logically impossible and the test generation fails. Any given computer architecture contains several such "instruction and data translation hazards" that need to be accommodated. If a rare hazard is a hardware state that is difficult to save and restore, then that hazard can be avoided by adding instructions that alter that state to the global class restrictions.

Computer system 100 is shown in simplified form sufficient for understanding the present invention. It should be understood that the present invention is not limited to the illustrated arrangement of computer system 100. Test generation 110 is shown in simplified form in FIGS. 1A and 1B and should be understood that the present invention is not limited to the illustrated arrangement of test generation 110.

Example embodiments for implementing test generation 110 in accordance with invention include the example loop passes as illustrated in FIGS. 2, 3, 4, 5, 6, 7, 8, and 9.

Referring now to FIGS. 2 and 3, there is shown an example first loop or example loop 1, first pass 200 and example loop 1, second pass 300 that is typical of a test definition defined by a verification engineer. The verification engineer carefully defines the existence of a loop and the loop control but leaves the body of the loop open to random instructions using the constrained test program generator 110 in accordance with the preferred embodiment.

In FIGS. 2 and 3, the illustrated example loop 1, first pass 200 and example loop 1, second pass 300 includes an example code sequence of instructions each including an instruction address label or value 202, a pseudo-assembly code or instruction pseudo mnemonic 204 for a generalized processor architecture, a register value 206, comments 208, and a reference 210. All values shown are hexadecimal. These instructions are generated by the constrained random test generator 110. All instructions are defined in the test definition 150, but some are highly constrained, such as the instructions involved in creating the loop while others are very loosely constrained, such as the random loop body.

The test definition 150 defines the start of the loop, generates random instructions until it is ready to close the loop. Then closes the loop by branching to the start of the loop. The test definition also ensures that the loop, once reentered will eventually exit. In this example, the loop exit mechanism is a reserved register containing loop count value. Register values are shown as if they were 16 bits wide.

FIG. 2 shows a view of the state of memory after original generation of the loop, often referred to as the first pass. The following text description is from the point of view of the test generator 110.

At reference 100, a load immediate of register 5 is shown with the value 1000. This could also very well have been done as an initialization statement of register 5 by the test generator 110. It is shown here as an actual instruction because in a real computer system program, all initialization is done using instructions. Also, this example could very well be just a small part of a very long test, and all registers have already been used before. What is important to the example for the instruction shown as reference 100 is that the value in register 5 is placed there before the beginning of the loop. As far as the loop is concerned, register 5 has 'an initial value'. Likewise, the instruction at reference 102 is a simple initial value for use later in the loop.

Reference 101 shows an instruction that is very specific and placed there, in the test definition 150 by the verification engineer as part of defining the loop behavior. The verification engineer intends to create a loop using a common computer system architecture feature called 'branch on count'. The intended use of 'branch on count' is understood by a person acquainted with computer system architectures. In designing this loop, the verification engineer intends to use register 15 as a 'count register' and intends the instructions in the loop to execute 3 times, thus register 15 needs to contain a value of 3. In addition to placing this instruction at this location in the test, the verification engineer specifies, though the test definition, that register 15 is 'reserved' and that the test generation program is not to use register 15 for any purpose in any 'random' instructions. The concept of a reserved register is known to a verification engineer accustomed to use of a constrained random test generator.

In reference 103, the verification engineer, through the test definition 150, declares the current instruction address as the beginning of a loop. In IBM's Genesys-pro constrained random test generator, this is done by marking the following instruction sequence with a general attribute called 'reentrant' and telling the test generator to remember the current instruction address location as an address label. These actions, attributes and statements are well known to a verification engineer accustomed to using a constrained random test generator. Then the test generator 110 proceeds. In this example the test generator 110 has been instructed to generate 2 completely random instructions. The test generator 110 randomly selects the instructions for references 103, and 104. For this example, a chain of register dependencies is shown that ends in a conditional branch where the branch is taken.

When ever a random branch is taken, IBM's Genesys-pro activates a 'Branch-Not-Taken' mechanism. In this case, reference 105 is located immediately after the branch and a random instruction is generated and inserted into the test and then the test generator 110 switches back to the normal execution flow on the 'Branch-Taken' path at address 2100, reference 108.

At reference 108, the test definition 'closes' the loop by specifying a 'branch-on-count' instruction, using register 15 as the count register and a branch target of "StartLoop1". At this point, the original generation of the loop is complete and the first pass of the loop is done. The test generator 110 recognizes that a loop has occurred and enters a mode called 'reentrancy' where previously generated instructions are executed without any new generation. This mode continues until a loop exit occurs.

In FIG. 3, "Reentrant" execution proceeds for references 203 and 204. The result of execution of instruction reference 203 is a condition of 'zero', which affects the conditional branch executed at reference 204. The conditional branch at reference 204 becomes 'not taken' and execution proceeds to a location which at original generation time was a 'branch-not-taken' leg at reference 205. The instruction at reference 205 is executed.

Now the test generator is situated at reference 206, address 2018, which is unoccupied by any previously generated instruction and now exits regeneration mode and returns to the test definition 150 for directions. For this simple example, the test definition 150 is done and the test generator 110 establishes an 'End-of-test' marker in the final test. Note that the verification engineer planned a loop to execute a total of 3 times, controlled by the 'branch-on-count' at address 2100 (reference 208) but the random instructions in the loop body only executed twice (once for original generation in FIG. 2, and again as reentrant mode in FIG. 3) and the 'loop' ending 'branch-on-count' instruction only executed once. This situation is known as an early exit from a loop and is not what the verification engineer wanted.

In FIGS. 4 and 5, the illustrated example loop 1, first pass 400 and example loop 1, second pass 500 includes an example code sequence of instructions each including an instruction address label or value 202, a pseudo-assembly code or instruction pseudo mnemonic 204 for a generalized processor architecture, a register value 206, comments 208, and a reference 210.

Referring to FIG. 4, the solution to the early exit from a loop due to conditional branches, where we have a "Branch-Not-Taken" mechanism is use of a "Converged Branch". FIG. 4 shows the sequence. The sequence is nearly identical to that in FIG. 2, except for reference 306, which in reference 106 is empty, here we use the "Address History" in the BNT routine to acquire the original address of the branch target and the original address (both logical and real) of the last branch instruction and, comparing to the current machine state instruction address, the BNT routine can determine if the "Converging Branch" instruction needs to branch to the original branch target or branch to the next sequential instruction address after the original branch instruction. The sequence of instructions that make up the "Converged Branch" BNT, can be arbitrarily complicated with any number of non branch type instructions and several levels of conditional branch, each with it's own BNT with a converging branch. Converging branches can also be implemented as a complementary pair of conditional branches instead of the unconditional branch shown here in the example loop 1, first pass 400. Such a pair, as an example, could be a branch on zero followed immediately by a branch on not-zero.

FIG. 5 shows how the instructions generated for FIG. 4, behave on the second iteration. Compared to FIG. 3, when execution arrives at reference 206 and we experience an early exit from the loop, now, in reference 406 we branch to the originally generated instruction sequence (reference 408). Thus the random variation as a result of using a constrained random test generator 110 that causes a branch to change direction on subsequent iterations, the "Converged Branch BNT" causes the branch-taken and branch-not taken paths to converge back to the original instruction path. Using this technique allows completely random conditional branches in loops. This method works for all types of conditional branches and jumps where the condition is subject to random variation with each iteration of the loop, including but not limited to conditional branches, branch on count and compare-and-jump.

Referring now to FIGS. 6 and 7, the illustrated example loop 2, first pass 600 and example loop 2, second pass 700 includes an example code sequence of instructions each including an instruction address label or value 202, a pseudo-assembly code or instruction pseudo mnemonic 204 for a generalized processor architecture, a register value 206, comments 208, and a reference 210.

The next example of an early exit from a loop involves address translation that causes a translation exception interrupt. An advanced computer system uses address translation to convert 'logical' addresses that the programmer sees to 'absolute' addresses that the computer hardware uses. If a program attempts to use a logical address that has not yet been loaded into the computer system's translation tables, the computer system responds by taking an exception, which redirects the flow of instruction execution to a new address, and the old instruction sequence that experienced the exception, is abandoned. For example, see IBM's "z/Architecture, Principles of Operation" or IBM's "Power Instruction Set Architecture" for a complete description of how two typical computer system translation mechanisms operate.

The operation of the test generator 110 to create the loop is identical to example 1, such as shown in FIG. 2. Here, in example loop 2, there are two 'random' instructions in the loop body. The first one, reference 502 is a load instruction, for which the test generator 110 creates all the necessary address translation data necessary for an uninterrupted load from memory, without an address translation exception. The instruction marked by reference 503 alters register 5, which was used as a base register to calculate the address to load, back in reference 502.

When the test generator 110 enters 'reentrant' mode to process the second pass 700 of the loop 2, it encounters the load instruction reference 602 and calculates an address to load of 2334. At this point the test generator 110 will look for a translation for address 2334. For this example, that address has not been used before. When ever a full function test generator encounters an address that has not been translated, it will normally run standard routines to establish a translation. Part of the normal function of the test generator 110 is, by design, to allow a random chance that any new address used will result in one of an assortment of translation faults. For this example, the test generator 110 randomly decided that address 2334, used by the instruction in reference 602 for the first time, will experience a translation fault. It could also be that the example in FIG. 7, is just a very small section of a very long test and that an address similar to 2334 has already been referenced before and has already been established to experience a translation fault. In that case, when the instruction in reference 602 is encountered in our hazardous loop example 2, the test generator 110 would have no choice but to produce an address translation exception.

For this simple example, the exact workings of an exception handler are skipped and we show only the last instruction of the exception handler that does a "return" back to the test generator. For the IBM Genesys-Pro z/Architecture constrained random test generator, it is very likely that the exception handler will not return to the instruction in reference 503 to enable the loop to continue to normal exit. A normal exit, in this case is meant that the branch on count causes the count register (register 15) to decrement to 0 and then the branch is 'not-taken'. A real exception handler will have more instructions that provide an assortment of features. Here is shown only the last instruction, which ends the exception handler and 'returns' back to the constrained random test generator. The z/Architecture exception handler was specifically designed to be established as new and unique each time an exception is called, even if the instruction that experienced the interrupt is in a reentrant loop. The exception handler is also designed to often return to random locations. The disclosed method here to remain in a loop altered the nature of the exception handlers to provide (based on user control directives) a "return" to the next sequential address after the instruction that experienced the interrupt. There are cases when an interrupt is a result of an address translation exception of the instruction address, where an attempt to return back to the next sequential address after the exception address would result in an immediate additional exception, and this cycle would repeat for a very long time, or forever.

Referring also to FIG. 8, an example loop exception, example loop 2, second pass 800 reentrant mode, and no exit is shown. In this event, the newly disclosed exception handler is able to detect the situation based on the current machine state and calculate a deterministic return address based on the original exception address instead of returning to a random address. This allows an interrupt experienced in a loop to return to a deterministic address, and always return to the same location for each iteration of the loop, as shown in FIG. 8. The original test generation is the same as in FIG. 2 because, in this example, the exception first occurred in pass 2 of the loop.

A similar situation occurs even when the exception occurs on the original generation of instructions.

Referring also to FIG. 9, an example loop exception, example loop 2B, first pass 900 is shown. FIGS. 6, 7 and 8 show a way to deal with exceptions and still stay in a loop by using a translation exception resulting from random changes to registers used in storage references. There are many reasons for a complex computer architecture to encounter exception conditions that lead to a program interrupt, many of which are not related to address exceptions. Example loop 2 was chosen to show an address translation exception to enable reuse for this "Read-Only" register example loop 2B where the sequence of the original generation and first pass execution is reused exactly FIGS. 6 and 7 as a demonstration of the problem. One addition to example 2, used here for example loop 2B, is an initialization of register 6, shown in FIG. 9 reference 899. In actual practice, in a constrained random test generator, register 6 could receive an initial value at the beginning of test generation through means not relevant to the current invention. It is shown here initialized using a load immediate instruction only as a matter of convenience.

The verification engineer, through the test definition, or usually through built-in features of the test generation knowledge related to loops, specifies that a loop will be established and that there are to be "Read Only" registers and that Register 6 is a "Read Only" register and that any time the test generator generates an instruction, either fully constrained or loosely constrained, or not constrained at all, the test generator will select "Read Only" registers for use in calculating all storage addresses, for both data and instruction addresses, and that such use of "Read Only" registers is a mandatory constraint.

In the problematic example loop 2, of FIG. 6 a load instruction (reference 502) uses a register for data address calculation that is modified in the loop (reference 503). In FIG. 9, in the solution example loop 2B, first pass 900 the test generator switches to use of the "Read Only" register 6 in generating the load instruction referenced as 802. As register 6 never changes value, the instruction originally generated as reference 802 never experiences a translation exception in subsequent iterations of the loop.

Figure 10:
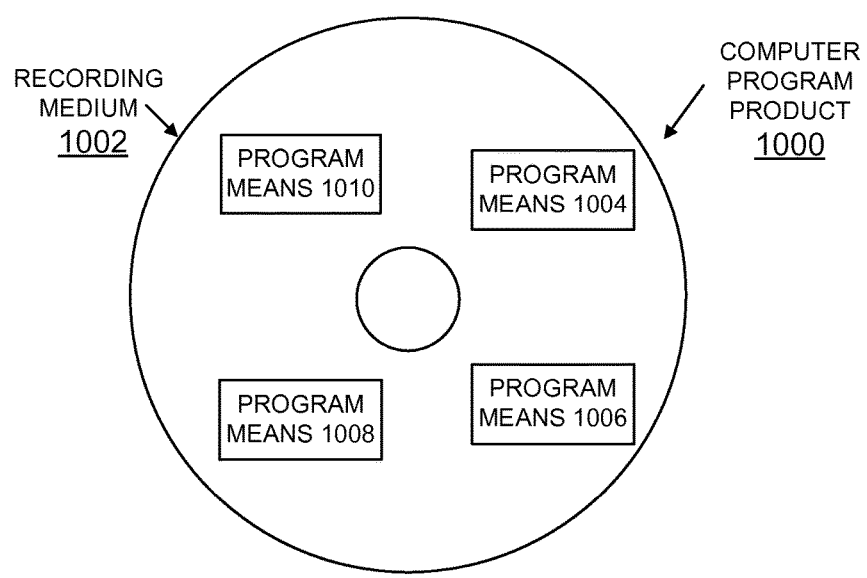
FIG. 10 is a block diagram illustrating a computer program product in accordance with the preferred embodiment.

Referring now to FIG. 10, an article of manufacture or a computer program product 1000 of the invention is illustrated. The computer program product 1000 is tangibly embodied on a non-transitory computer readable storage medium that includes a recording medium 1002, such as, a floppy disk, a high capacity read only memory in the form of an optically read compact disk or CD-ROM, a tape, or another similar computer program product. Recording medium 1002 stores program means 1004, 1006, 1008, and 1010 on the medium 1002 for carrying out the methods for implementing random content of program loops in random test generation for processor verification of the preferred embodiment in the system 100 of FIGS. 1A, and 1B.

A sequence of program instructions or a logical assembly of one or more interrelated modules defined by the recorded program means 1004, 1006, 1008, and 1010, direct the system 100 for implementing random content of program loops in random test generation of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing processor verification testing with random content of program loops in random test generation for processor pre-silicon functional verification comprising:
    a processor,
    a constrained random test generator tangibly embodied in a non-transitory machine readable medium used in the processor verification testing;
    said processor implementing said constrained random test generator performing processor verification testing and generating random instructions in a program loop and implementing random content of program loops for the processor verification testing, said processor implementing said constrained random test generator performing the pre-silicon functional processor verification testing steps of:
    converging all random conditional branches to a main program loop using a converged branch instruction stream;
    enabling program interrupts to converge to the main program loop using a built in exception handling mechanism being provided in said constrained random test generator;
    allowing register based storage addresses to maintain a value using mandatory read only registers applied to said constrained random test generator;
    avoiding inherently problematic operations for the program loops using global class restriction mechanism applied to said constrained random test generator; and
    preserving storage addressability using machine state detection and restoration mechanisms; applying a functional result to a test case definition with each of said converged branch instruction stream, said built in exception handling mechanism, said mandatory read only registers; said global class restriction mechanism and said machine state detection and restoration mechanisms, and each in combination in said constrained random test generator, said predefined test definition including a memory logical address of the random conditional branch, and a target logical address of the random conditional branch;
    said processor performing the processor verification testing using said predefined test definition, generating random instructions for a processor execution path ending with an unconditional branch to the same memory logical address of the random conditional branch; and
    said processor using said predefined test definition ensures reliable generation of constrained random tests involving multiple iterations of the program loop for the processor verification testing.

2. The apparatus as recited in claim 1 wherein said built in exception handling mechanism uses hardware state information to calculate a return address after the program interrupt.

3. The apparatus as recited in claim 1 wherein said mandatory read only registers provide global generation hard constraints.

4. The apparatus as recited in claim 1 wherein said global class restriction mechanism provides specific restricted instruction classes.

5. The apparatus as recited in claim 1 wherein said global class restriction mechanism allows iteratively executed predefined random test descriptions in the program loop.

6. The apparatus as recited in claim 1 wherein said machine state detection and restoration mechanisms enable generation of constrained random tests with multiple loop iterations.

7. A method for implementing processor verification testing with random content of program loops in random test generation for pre-silicon functional processor verification comprising:
    providing a processor,
    providing a constrained random test generator tangibly embodied in a non-transitory machine readable medium used in the processor verification; said processor using said constrained random test generator performing processor verification testing and generating random instructions in a program loop, and implementing random content of program loops for the pre-silicon functional processor verification, said processor using said constrained random test generator performing the processor verification testing steps of:
    converging all random conditional branches to a main program loop using a converged branch instruction stream provided by said constrained random test generator;
    enabling program interrupts to converge to the main program loop using a built in exception handling mechanism provided in said constrained random test generator;

applying mandatory read only registers to said constrained random test generator for allowing register based storage addresses to maintain a value;

applying global class restriction mechanism to the constrained random test generator for avoiding inherently problematic operations for the program loops; and providing machine state detection and restoration mechanisms in said constrained random test generator to preserve storage addressability;

applying a functional result from each of said converged branch instruction stream, said built in exception handling mechanism, said mandatory read only registers; said global class restriction mechanism; and said machine state detection and restoration mechanisms to a test case definition, and each in combination in said constrained random test generator, said predefined test definition including a memory logical address of the random conditional branch, and a target logical address of the random conditional branch;

said processor performing the processor verification testing using said predefined test definition, generating random instructions for a processor execution path ending with an unconditional branch to the same memory logical address of the random conditional branch; and said processor using said predefined test definition, ensures reliable generation of constrained random tests involving many iterations of a loop for the processor verification testing.

8. The method as recited in claim 7 includes said built in exception handling mechanism using hardware state information to calculate a return address after the program interrupt.

9. The method as recited in claim 7 includes said mandatory read only registers providing global generation hard constraints.

10. The method as recited in claim 7 includes said global class restriction mechanism providing specific restricted instruction classes.

11. The method as recited in claim 7 includes said global class restriction mechanism allowing iteratively executed predefined random test descriptions in the program loop.

12. The method as recited in claim 7 includes said machine state detection and restoration mechanisms enabling generation of constrained random tests with multiple loop iterations.

* * * * *